(12) United States Patent
Becht et al.

(10) Patent No.: US 9,792,167 B1
(45) Date of Patent: Oct. 17, 2017

(54) TRANSPARENT NORTH PORT RECOVERY

(71) Applicant: INTERNATIONAL BUSINESS MACHINES CORPORATION, Armonk, NY (US)

(72) Inventors: Michael J. Becht, Poughkeepsie, NY (US); Clinton E. Bubb, Pleasant Valley, NY (US); Jeffrey C. Hanscom, Poughkeepsie, NY (US); Andreas Kohler, Boeblingen (DE); Ying-Yeung Li, Pleasant Valley, NY (US); Mushfiq U. Saleheen, Poughkeepsie, NY (US); Raymond Wong, Hopewell Junction, NY (US); Jie Zheng, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/277,218

(22) Filed: Sep. 27, 2016

(51) Int. Cl.
*G06F 11/16* (2006.01)
*G06F 11/07* (2006.01)
*G06F 11/14* (2006.01)

(52) U.S. Cl.
CPC ...... *G06F 11/0745* (2013.01); *G06F 11/0757* (2013.01); *G06F 11/0772* (2013.01); *G06F 11/0793* (2013.01); *G06F 11/1443* (2013.01)

(58) Field of Classification Search
USPC .......................................................... 714/56
See application file for complete search history.

(56) References Cited

U.S. PATENT DOCUMENTS

| 5,815,647 A * | 9/1998 | Buckland | G06F 11/0745 710/104 |
| 6,745,345 B2 * | 6/2004 | Cabezas | G06F 11/221 714/33 |
| 6,904,546 B2 * | 6/2005 | Wu | G06F 11/0745 714/36 |
| 6,996,750 B2 * | 2/2006 | Tetreault | G06F 11/0745 714/43 |

(Continued)

FOREIGN PATENT DOCUMENTS

| CN | 103270497 B | 6/2016 |
| EP | 2359534 B1 | 6/2010 |

*Primary Examiner* — Kamini Patel
(74) *Attorney, Agent, or Firm* — Cantor Colburn; Steven Chiu

(57) ABSTRACT

Examples of techniques for transparent north port recovery of an error in an input/output device are disclosed. In one example implementation according to aspects of the present disclosure, a computer-implemented method may include: detecting, by a processing device, a command timeout; sending, by the processing device, an input/output (I/O) error signal to a host processing system connected to the hardware device via a north port of the hardware device; terminating, by the host processing system, a link between the north port of the hardware device and the host processing system; enabling, by the processing device, halt command forwarding on the hardware device; halting, by the processing device, commands upon detecting the halt command forwarding; and resetting, by the processing device, the link between the north port of the hardware device and the host processing system.

20 Claims, 5 Drawing Sheets

(56) References Cited

U.S. PATENT DOCUMENTS

| | | | |
|---|---|---|---|
| 7,191,255 B2* | 3/2007 | Wong | G06F 13/423 |
| | | | 710/15 |
| 8,266,489 B2* | 9/2012 | Marczewski | H04L 1/1874 |
| | | | 714/749 |
| 9,086,965 B2* | 7/2015 | Adar | G06F 11/0745 |
| 2005/0177760 A1* | 8/2005 | Oohira | G06F 11/141 |
| | | | 714/2 |
| 2007/0156934 A1* | 7/2007 | Ho | G06F 13/4027 |
| | | | 710/105 |
| 2009/0210607 A1* | 8/2009 | Hanscom | G06F 11/0745 |
| | | | 710/315 |
| 2012/0311213 A1* | 12/2012 | Bender | G06F 13/364 |
| | | | 710/113 |
| 2013/0060987 A1* | 3/2013 | Bolen | G06F 13/00 |
| | | | 710/316 |
| 2014/0229769 A1 | 8/2014 | Abraham et al. | |
| 2016/0134375 A1* | 5/2016 | Kakande | H04J 14/02 |
| | | | 398/135 |

* cited by examiner

TRANSPARENT NORTH PORT RECOVERY

BACKGROUND

The present disclosure generally relates to hardware error detection and recovery and, more particularly, relates to transparent north port recovery of an error in an input/output device.

Hardware detected errors and recovery in a hardware device such as an input/output (I/O) card can be expensive in terms of processing system resources and time. Detection and recovery may require chip reset and complex recovery algorithms involving both software and hardware resources. Sometimes recovery may require an I/O card to be physically replaced.

SUMMARY

According to examples of the present disclosure, techniques including methods, systems, and/or computer program products for transparent north port recovery of an error in an input/output device are provided. An example method may include: detecting, by a processing device, a command timeout. The example method may further include sending, by the processing device, an input/output (I/O) error signal to a host processing system connected to the hardware device via a north port of the hardware device. The example method may further include terminating, by the host processing system, a link between the north port of the hardware device and the host processing system. The example method may further include enabling, by the processing device, halt command forwarding on the hardware device. The example method may further include halting, by the processing device, commands upon detecting the halt command forwarding. The example method may further include resetting, by the processing device, the link between the north port of the hardware device and the host processing system.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of transparent north port recovery of an error in a hardware device, such as an input/output (I/O) card. It should be appreciated that not all hardware errors need to be notified to firmware of the hardware device experiencing the error. The present techniques provide a set of operations that can be retried if an error is detected. The present techniques can be used without involving traditional complex recovery techniques. This enables a port of the hardware device to remain active while a communication link (i.e., a peripheral component interconnect express (PCIe) link) between the hardware device and a host processing device resets.

Example embodiments of the disclosure include or yield various technical features, technical effects, and/or improvements to technology. Example embodiments of the disclosure provide transparent north port recovery for an input/output device by halting command forwarding between the I/O device and the host processing system so that a port on the hardware device connected to the host possessing system to be reset. This enables portions of a hardware device between the I/O device and the host processing system to continue operating as normal with no knowledge of the reset.

These aspects of the disclosure constitute technical features that yield the technical effect of increasing I/O operation processing and increased uptime of the I/O device while reducing the complexity of recovery procedures. As a result of these technical features and technical effects, the transparent north port recovery techniques presented in accordance with example embodiments of the disclosure represents an improvement to recovery techniques. It should be appreciated that the above examples of technical features, technical effects, and improvements to the technology of example embodiments of the disclosure are merely illustrative and not exhaustive.

Figure 1:
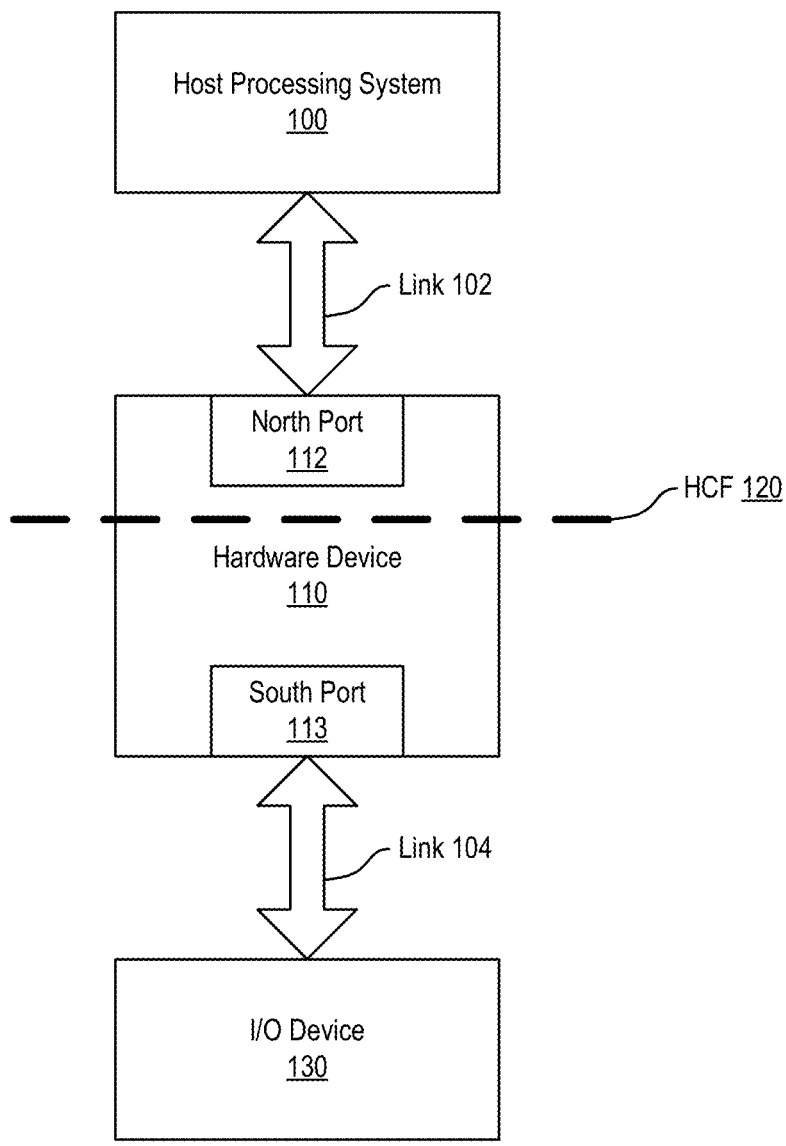
FIG. 1 illustrates a block diagram of a host processing system for transparent north port recovery of an error in an input/output device according to examples of the present disclosure.

FIG. 1 illustrates a block diagram of a host processing system 100 for transparent north port 112 recovery of an error in an input/output device 130 according to examples of the present disclosure. The host processing system 100 may be any suitable computer processing system, including distributed computer processing systems and mainframe computer processing systems such as a z/Architecture system by IBM®. In one example, the host processing system is a processing system such as the processing system 20 of FIG. 5.

The host processing system 100 is connected to the hardware device 110 via a link 102 at a north port 112 of the hardware device 110. An input/output (I/O) device 130 is connected to a south port 113 of the hardware device 110 via a link 104. It should be appreciated that the links 102, 104 may be any suitable communication link, such as a peripheral component interconnect (PCI) link, a peripheral component interconnect express (PCIe) link, or other suitable communication link for communicating input/output (I/O) operations between the host processing system 100, the hardware device 110, and the I/O device 130.

In the event that the hardware device 110 detects an error in a command initiated by the I/O device, the hardware device 110 may enable halt command forwarding 120 to the host processing system 100 across the link 102 while the link 102 resets. Portions of the hardware device 110 (i.e., the portions "below" the halt command forward 120 line) may remain active and unaware of the reset of the link 102. Accordingly, this enables the south port 113 of the hardware device 110 to remain active while the link 102 resets. In other words, the I/O device 130 can continue to send commands to the host processing system 100 via the hardware device 110. The I/O device 130 is unaware that the link 102 is being reset because the hardware device 110 continues to receive data from the I/O device 130. When the link 102 is reset, when the north port 112 is initialized by the host processing system 100, and when outstanding commands to the north port 112 receive the attention responses or there are no more outstanding commands to the north port 112, the hardware device 110 disables halt command forwarding 120 and outstanding requests from the I/O device 130 can be processed by the hardware device 110 and sent to the host processing system 100 across the link 102.

Figure 2:
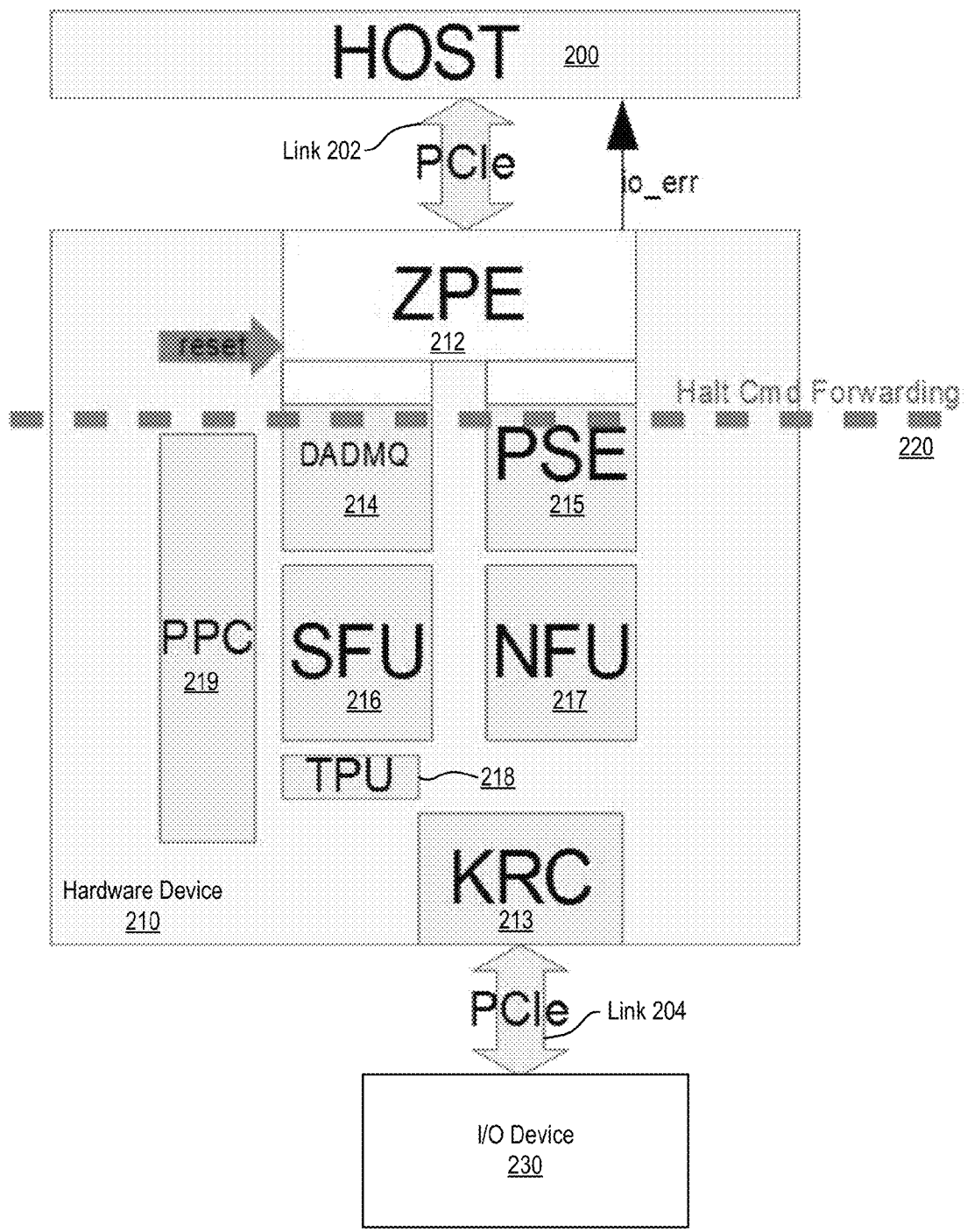
FIG. 2 illustrates a block diagram of a host processing system for transparent north port recovery of an error in an input/output device according to examples of the present disclosure.

FIG. 2 illustrates a block diagram of a host processing system 200 for transparent north port 212 recovery of an error in an input/output device 230 according to examples of the present disclosure. Similarly to FIG. 1, the host processing system 200 may be any suitable computer processing system, including distributed computer processing systems and mainframe computer processing systems such as a z/Architecture system by IBM®. In one example, the host processing system is a processing system such as the processing system 20 of FIG. 5. The example of FIG. 2 describes one implementation using a z/Architecture system by IBM®.

The host processing system 200 is connected to the hardware device 210 via a link 102 (e.g., a PCIe link) at a north port 212 of the hardware device 210. The north port 212 of FIG. 2 is referred to a z/protocol engine.

An input/output (I/O) device 230 is connected to a south port 213 of the hardware device 210 via a link 204 (e.g., a PCIe link). The south port 213 of the hardware device 210 may be referred to as a kraken root complex (KRC) port It should be appreciated that the links 202, 204 may be any suitable communication link, such as a peripheral component interconnect (PCI) link, a peripheral component interconnect express (PCIe) link, or other suitable communication link for communicating input/output (I/O) operations between the host processing system 200, the hardware device 210, and the I/O device 230.

According to the present techniques, if a command timeout is detected by a data assist data mover queue (DADMQ) 214 or a programmable sequence element (PSE) 214 or an error is detected by the north port (i.e., system-Z PCIe endpoint (ZPE) 212), then a test pervasive unit (TPU) 218 sends an I/O error (io_err) signal to the host processing system 200. The host processing system 200 brings down the PCIe link 202 immediately and drops all pending response packets. The TPU 218 enables halt command forwarding (HCF) 220. The DADMQ 214 and the PSE 215 stop issuing commands to the north port (e.g., the ZPE 212) upon detecting the HCF 220. The TPU 218 resets the north port (e.g., the ZPE 212) and portions of the DADMQ 214 and the PSE 215.

In examples, the hardware device 210 further includes a storage functional unit (SFU) 216 and a network functional unit (NFU) 217. The SFU 216 facilitates I/O communications to and from a storage device. Similarly, the NFU 217 facilitates I/O communications to and from a network device. The SFU 216 and the NFU 217 remain active while the halt command forwarding is active.

The host processing system 200 then retrains the PCIe link 204 and initializes the north port (e.g., the ZPE 212), the DADMQ 214, and the PSE 215. The host processing system 200 taps the TPU 218 via the PCIe link 202 when it is time to send attention response, then the TPU 218 signals the DADMQ 214 and the PSE 215 to return attention response for all outstanding requests from the I/O device 230. The host processing system 200 releases halt command forwarding 220 once, and all outstanding requests in the DADMQ 214 and the PSE 215 receive their responses.

Upon receiving attention response, a power PC (PPC) 219, the PSE 215, and the DADMQ 214 can retry the commands. Units below the HCF line 220 have no knowledge that the north portion of the hardware device was just reset, and these portions (i.e., the portions below the HCF line 220) can operate as normal.

Figure 3:
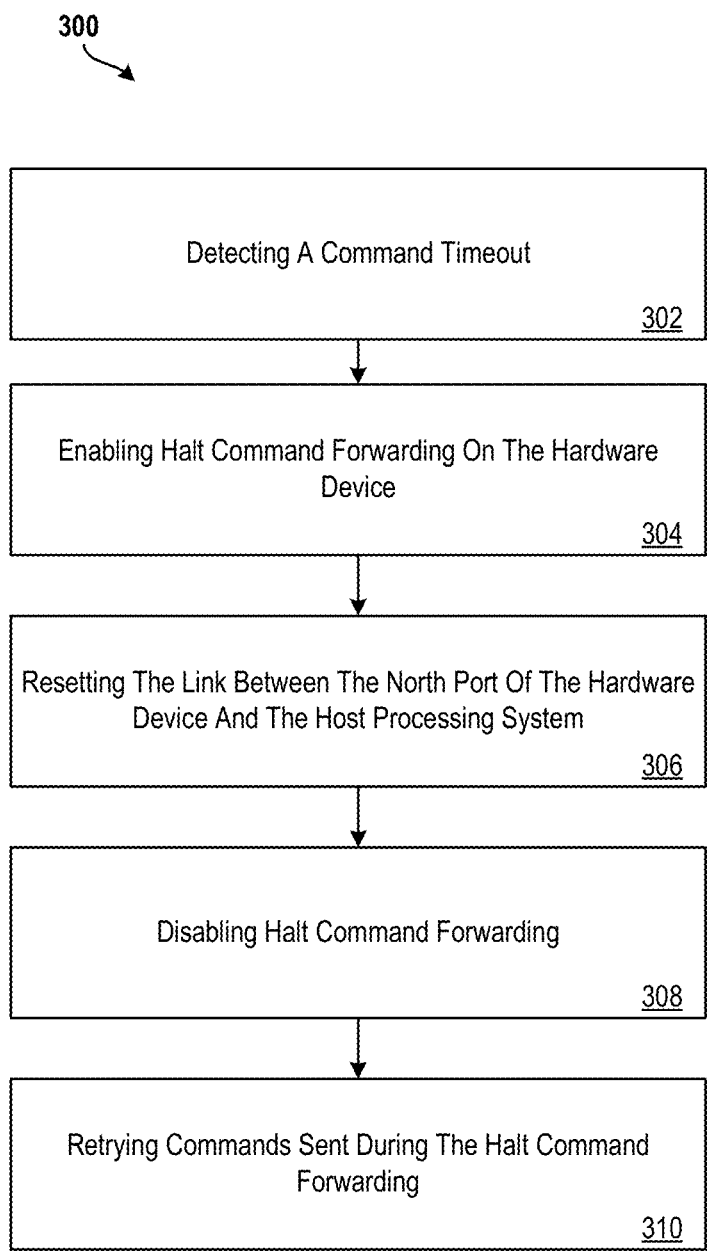
FIG. 3 illustrates a flow diagram of a method for transparent north port recovery of an error in an input/output device according to examples of the present disclosure.

FIG. 3 illustrates a flow diagram of a method 300 for transparent north port recovery of an error in an input/output device according to examples of the present disclosure. The method 300 may be performed, for example, by a suitable processing system, such as the host processing system 100 of FIG. 1, the host processing system 200 of FIG. 2, and/or the processing system 20 of FIG. 5.

At block 302, the method 300 includes detecting, by a processing device, a command timeout. At block 304, the method includes enabling halt command forwarding on the hardware device. In examples, this further includes sending an IO error line to the host processing system by the hardware device. At block 306, the method 300 includes resetting the link between the north port of the hardware device and the host processing system. This may further include initializing the north port after the link is retrained). At block 308, the method 300 disabling halt command forwarding. For example, halt command forwarding may be disabled only after attention response signaled and outstanding commands to north port received attention response. Once halt command forward is enabled, commands issued by the I/O device behind (i.e., below) the halt command forward are not counted as the outstanding commands to the north port. According to aspects of the present disclosure, the commands that went out to the north port before halt command forwarding is enabled and have not received responses are considered as outstanding commands to the north port.

At block 310, the method 300 includes retrying commands that received attention responses during the halt command forwarding. That is, commands sent before the halt command forwarding is enabled and received attention responses during the halt command forwarding may be retried after the link is reset and the halt command forwarding is disabled.

According to aspects of the present disclosure, the halt command forwarding may be disabled subsequent to resetting the link between the north port of the hardware device and the host processing system and outstanding command to the north port received the attention responses. The commands sent before halt command forwarding and received attention responses while the halt command forwarding is enabled may be resent after it is disabled.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
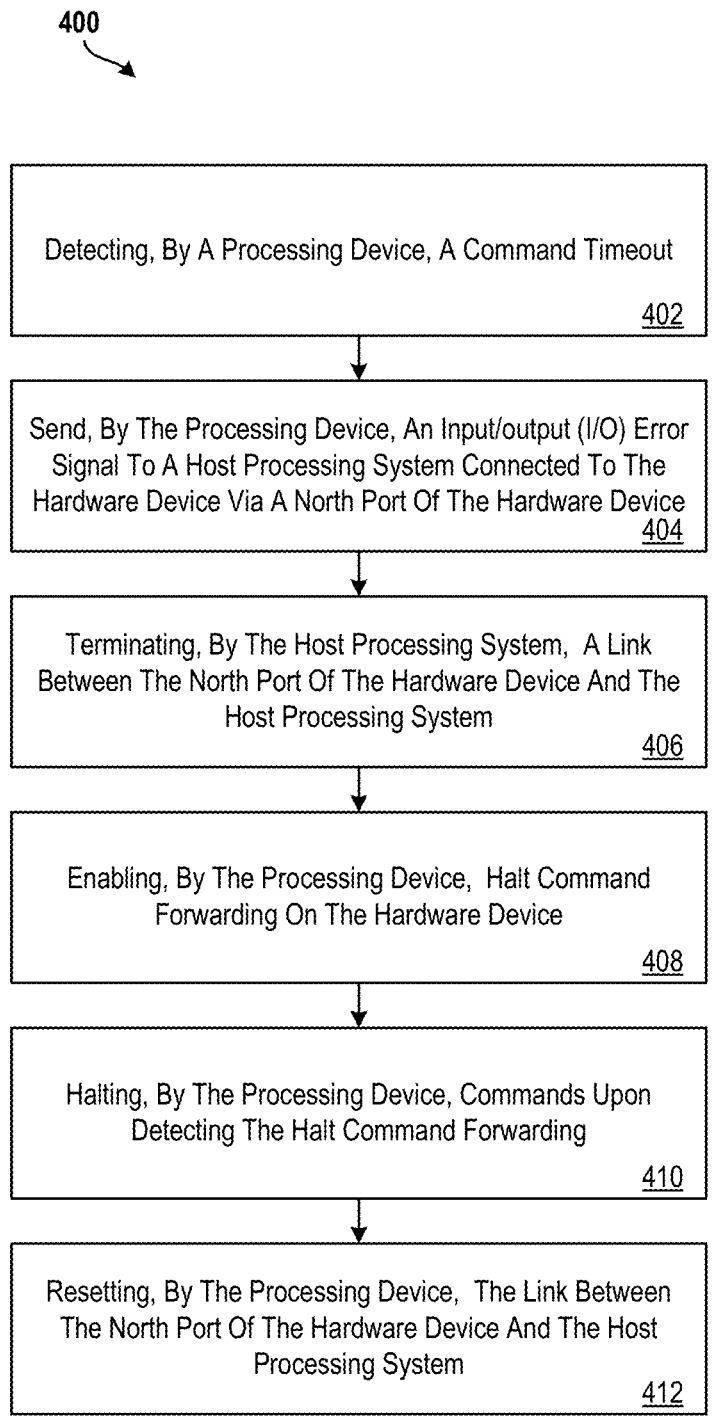
FIG. 4 illustrates a flow diagram of a method for transparent north port recovery of an error in an input/output device according to examples of the present disclosure.

FIG. 4 illustrates a flow diagram of a method 400 for transparent north port recovery of an error in an input/output device according to examples of the present disclosure. The method 400 may be performed, for example, by a suitable processing system, such as the host processing system 100 of FIG. 1, the host processing system 200 of FIG. 2, and/or the processing system 20 of FIG. 5.

At block 402, the method 400 includes detecting, by a processing device, a command timeout. At block 404, the method 400 includes sending, by a processing device, an input/output (I/O) error signal to a host processing system connected to the hardware device via a north port of the hardware device. At block 406, the 400 method includes terminating, by the host processing system a link between the north port of the hardware device and the host processing system. At block 408, the method 400 includes enabling halt command forwarding on the hardware device. At block 410, the method 400 includes halting, by the processing device, commands upon detecting the halt command forwarding. At block 412, the method 400 includes resetting the link between the north port of the hardware device and the host processing system.

Additional processes also may be included, and it should be understood that the processes depicted in FIG. 4 represent illustrations, and that other processes may be added or existing processes may be removed, modified, or rearranged without departing from the scope and spirit of the present disclosure.

According to aspects of the present disclosure, the host processing system initializes the north port after the PCIe link between the host processing system and the hardware device is reset and retrained. The host processing system taps the TPU via the PCIe link when it is time to send attention response, then the TPU signals the DADMQ and the PSE to return attention response for all outstanding requests from the I/O device. The host processing system releases halt command forwarding once, and outstanding requests in the DADMQ and the PSE receive their responses.

Figure 5:
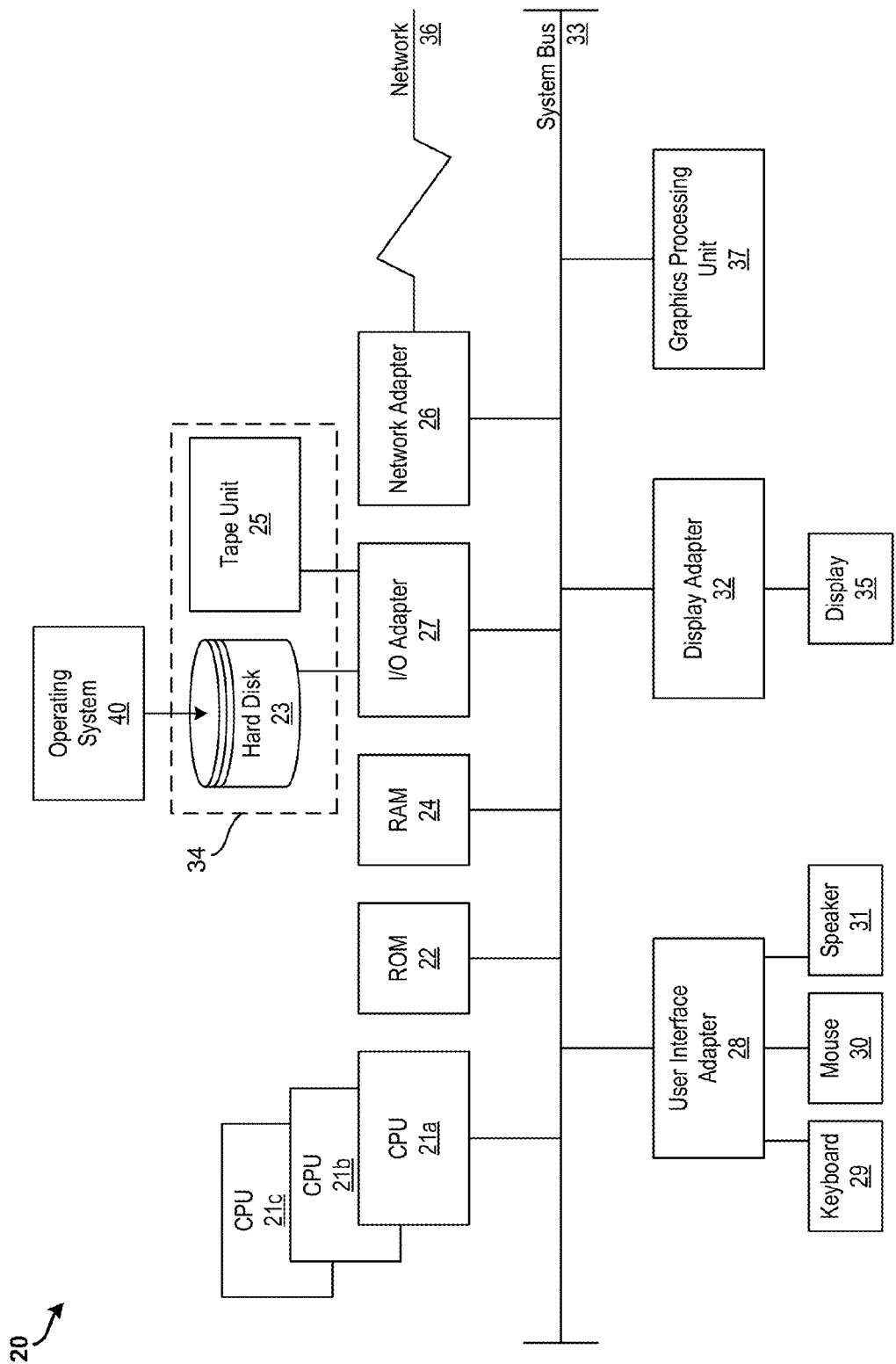
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for transparent north port recovery of an error in a hardware device, the method comprising:
    detecting, by a processing device, a command timeout;
    sending, by the processing device, an input/output (I/O) error signal via a north port of the hardware device to cause a link at the north port of the hardware device to be terminated;
    enabling, by the processing device, halt command forwarding on the hardware device upon the termination of the link;
    halting, by the processing device, commands upon detecting the halt command forwarding; and
    resetting, by the processing device, the link,
    wherein the hardware device comprises a test pervasive unit (TPU) that sends the I/O error signal to the host processing system via the north port of the hardware device.

2. The computer-implemented method of claim 1, wherein the link is between the north port of the hardware device and a host processing system, the method further comprising:

terminating, by the host processing system, the link; and
disabling, by the processing device, the halt command forwarding subsequent to resetting the link between the north port of the hardware device and the host processing system.

3. The computer-implemented method of claim 2, further comprising retrying commands sent before halt command forwarding is enabled and received attention responses while the halt command forwarding is enabled.

4. The computer-implemented method of claim 1, wherein a south port of the hardware device remains active while the halt command forwarding is enabled.

5. The computer-implemented method of claim 4, wherein an I/O device is connected to the hardware device via the south port of the hardware device.

6. The computer-implemented method of claim 2, wherein terminating the link further comprises dropping pending response packets.

7. The computer-implemented method of claim 1, wherein the hardware device comprises at least one of a data assist data mover queue, a programmable sequence element, a test pervasive unit, and a power processing unit.

8. A system for transparent north port recovery of an error in a hardware device, the system comprising:
    a memory having computer readable instructions; and
    a processing device for executing the computer readable instructions, the computer readable instructions comprising:
        detecting, by the processing device, a command timeout;
        sending, by the processing device, an input/output (I/O) error signal via a north port of the hardware device to cause a link at the north port of the hardware device to be terminated;
        enabling, by the processing device, halt command forwarding on the hardware device upon the termination of the link;
        halting, by the processing device, commands upon detecting the halt command forwarding; and
        resetting, by the processing device, the link,
        wherein the hardware device comprises a test pervasive unit (TPU) that sends the I/O error signal to the host processing system via the north port of the hardware device.

9. The system of claim 8, wherein the link is between the north port of the hardware device and a host processing system, the computer readable instructions further comprising:
    terminating, by the host processing system, the link; and
    disabling the halt command forwarding subsequent to resetting the link between the north port of the hardware device and the host processing system.

10. The system of claim 9, the computer readable instructions further comprising retrying commands sent before halt command forwarding is enabled and received attention responses while the halt command forwarding is enabled.

11. The system of claim 8, wherein a south port of the hardware device remains active while the halt command forwarding is enabled.

12. The system of claim 11, wherein an I/O device is connected to the hardware device via the south port of the hardware device.

13. The system of claim 9, wherein terminating the link further comprises dropping pending response packets.

14. The system of claim 8, wherein the hardware device comprises at least one of a data assist data mover queue, a programmable sequence element, a test pervasive unit, and a power processing unit.

15. A computer program product for transparent north port recovery of an error in a hardware device, the computer program product comprising:
    a computer readable storage medium having program instructions embodied therewith, the program instructions executable by a processing device to cause the processing device to perform a method comprising:
        detecting, by the processing device, a command timeout;
        sending, by the processing device, an input/output (I/O) error signal via a north port of the hardware device to cause a link at the north port of the hardware device to be terminated;
        enabling, by the processing device, halt command forwarding on the hardware device upon the termination of the link;
        halting, by the processing device, commands upon detecting the halt command forwarding; and
        resetting, by the processing device, the link between the north port of the hardware device and the host processing system,
        wherein the hardware device comprises a test pervasive unit (TPU) that sends the I/O error signal to the host processing system via the north port of the hardware device.

16. The computer program product of claim 15, wherein the link is between the north port of the hardware device and a host processing system, the method further comprising:
    terminating, by the host processing system, the link; and
    disabling the halt command forwarding subsequent to resetting the link between the north port of the hardware device and the host processing system.

17. The computer program product of claim 16, the method further comprising retrying commands sent before halt command forwarding is enabled and received attention responses while the halt command forwarding is enabled.

18. The computer program product of claim 15, wherein a south port of the hardware device remains active while the halt command forwarding is enabled.

19. The computer program product of claim 18, wherein an I/O device is connected to the hardware device via the south port of the hardware device.

20. The computer program product of claim 16, wherein terminating the link further comprises dropping pending response packets.

* * * * *